(12) United States Patent
Meyer et al.

(10) Patent No.: US 7,711,507 B2
(45) Date of Patent: May 4, 2010

(54) METHOD AND DEVICE FOR DETERMINING THE RELATIVE POSITION OF A FIRST OBJECT WITH RESPECT TO A SECOND OBJECT, CORRESPONDING COMPUTER PROGRAM AND A COMPUTER-READABLE STORAGE MEDIUM

(75) Inventors: Andy Meyer, Berlin (DE); Dirk Doebler, Friedersdorf (DE)

(73) Assignee: Gesellschaft zur Foerderung angewandter Informatik e.V., Berlin (DE)

( * ) Notice: Subject to any disclaimer, the term of this patent is extended or adjusted under 35 U.S.C. 154(b) by 127 days.

(21) Appl. No.: 11/997,053

(22) PCT Filed: Aug. 4, 2006

(86) PCT No.: PCT/EP2006/065092

§ 371 (c)(1),
(2), (4) Date: Jan. 28, 2008

(87) PCT Pub. No.: WO2007/014966

PCT Pub. Date: Feb. 8, 2007

(65) Prior Publication Data

US 2008/0228433 A1  Sep. 18, 2008

(30) Foreign Application Priority Data

Aug. 4, 2005 (DE) .................. 10 2005 037 841

(51) Int. Cl.
*G06F 15/00* (2006.01)
(52) U.S. Cl. ........................................................ 702/94
(58) Field of Classification Search .................... 702/94
See application file for complete search history.

(56) References Cited

U.S. PATENT DOCUMENTS

| 4,754,417 | A | 6/1988 | Beeson |
| 5,208,763 | A | 5/1993 | Hong et al. |
| 2002/0109680 | A1 | 8/2002 | Orbanes et al. |
| 2005/0281410 | A1* | 12/2005 | Grosvenor et al. ............ 381/61 |

FOREIGN PATENT DOCUMENTS

| DE | 100 12 725 A1 | 9/2000 |
| DE | 199 10 329 A1 | 9/2000 |

(Continued)

OTHER PUBLICATIONS

Shin-ya Miyazaki, Modeling and Implementation of Elastic Object Manipulation in Virtual Space, p. 42-50, Electronics and Communications in Japan, Part 3, vol. 8 1, No. 4, 1998.*

(Continued)

*Primary Examiner*—Tung S Lau
(74) *Attorney, Agent, or Firm*—Norris McLaughlin & Marcus, PA

(57) ABSTRACT

A method and system determines a relative position of a first object in relation to a second object. A computer program and computer-readable storage medium is usable to determine a spatial position and orientation of measurement devices in environments of arbitrary complexity. A relative position of the objects and real coordinates of the location and orientation of the objects is determinable from computer simulation and virtual coordinates of a location and orientation of the first and second objects.

19 Claims, 14 Drawing Sheets

FOREIGN PATENT DOCUMENTS

| | | |
|---|---|---|
| DE | 695 31 009 T2 | 1/2004 |
| DE | 103 04 215 A1 | 8/2004 |
| DE | 103 45 743 A1 | 5/2005 |
| DE | 10 2004 031 291 A1 | 2/2006 |
| WO | 01/01075 A | 1/2001 |
| WO | 2004/101325 A | 11/2004 |

OTHER PUBLICATIONS

Oberkampf D et al; "Iterative Pose Estimation Using Coplanar Feature Points"; Computer Vision and Image Understanding, Academic Press, US, vol. 63, No. 3, May 1, 1996, pp. 495-511. Document provided.

Hoffer, Karl; "Die Akustik des neuen V6-TDI-Motors im Audi A8"; ATZ Automobiltechnische Zeitschrift, 1997, vol. 99, pp. 414-423. Abstract provided.

Pfeiffer, Von Georg et al.; "Moderne Prueftechnik in der BMW Antriebsentwicklung-Drei neue Spezialpruefstaende"; ATZ Automobiltechnische Zeitschrift 1997, vol. 99, pp. 446-454. Abstract provided.

* cited by examiner

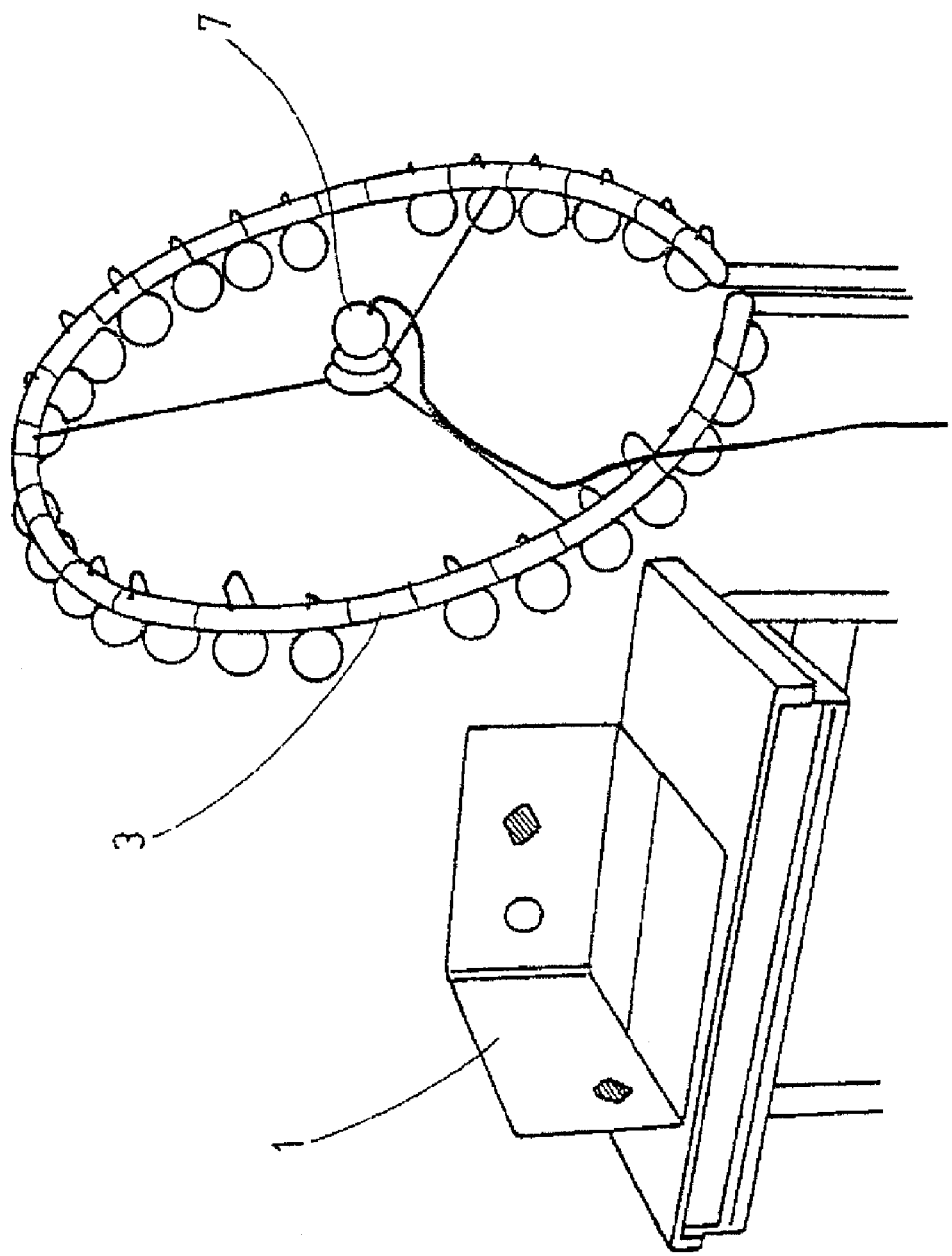

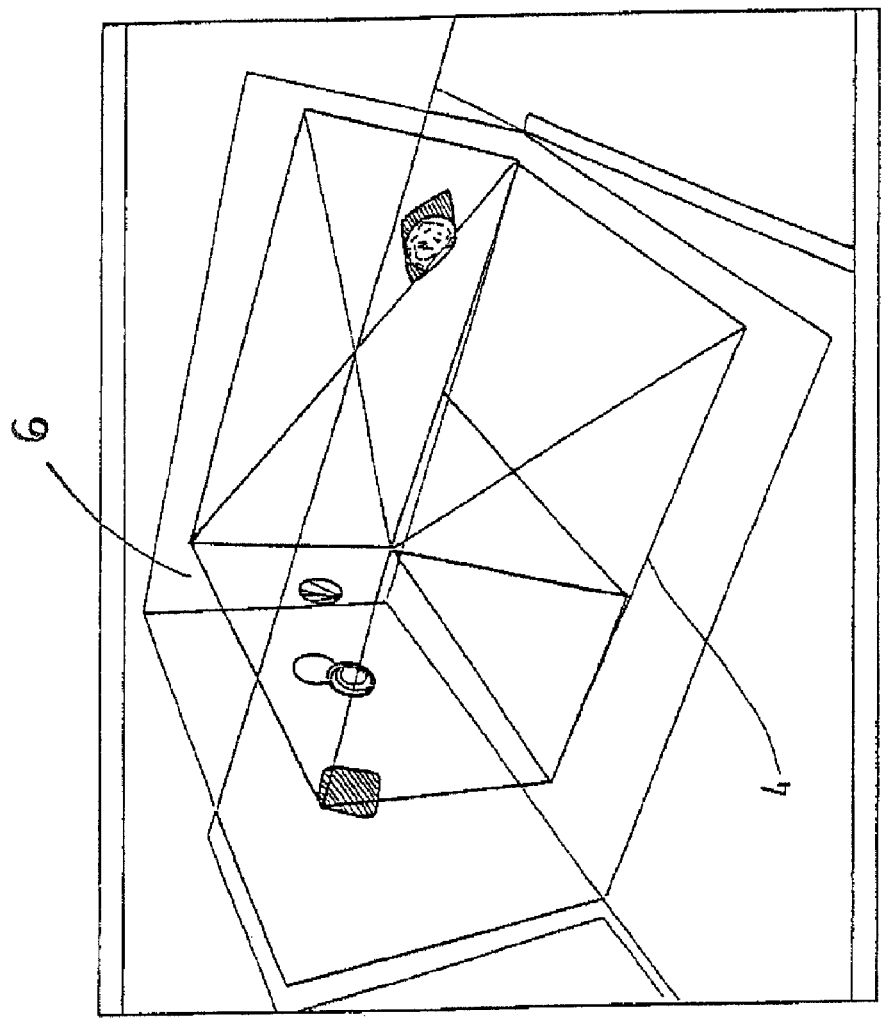

METHOD AND DEVICE FOR DETERMINING THE RELATIVE POSITION OF A FIRST OBJECT WITH RESPECT TO A SECOND OBJECT, CORRESPONDING COMPUTER PROGRAM AND A COMPUTER-READABLE STORAGE MEDIUM

The invention relates to a method and a system for determining the relative position of a first object in relation to a second object, and a corresponding computer program and a corresponding computer-readable storage medium which can be used, in particular, to determine the spatial position and orientation of measurement systems in environments of any complexity.

These situations are encountered, for example, when sound is visualized in an audio analysis, and the visualized sound representation is superimposed on the image representation of the audio sources. Systems for performing such audio analyses are generally referred to as acoustic camera.

Experiments were conducted to expand the audio analysis with an acoustic camera from two-dimensional space to three-dimensional space. The measurement was performed according to the following process flow:

1. The acoustic camera was set up in the space to be measured (interior space of an automobile, acoustic laboratory, etc.) according to the measurement conditions and the desired results (see FIG. 1);
2. A three-dimensional model of the space or of the measurement object and a model of the employed camera were loaded into the computer;
3. The position (i.e., the position and orientation) of the camera in space and relative to the measured object were determined manually;
4. The measurement and evaluation were performed.

In practical applications, step 3 of the above process turns out to be extremely problematic, inaccurate and time-consuming:

To determine a position and orientation, at least 6 measurements must be performed with a ruler/tape measure/protractor, and distances and solid angles must be determined (X-, Y-, Z-position, rotation about the X-, Y, Z-axis).

Additional problems are encountered because the acoustic camera and the model (the model is typically provided by the user) can have different coordinate systems, and can have tight spaces as well as skewed and/or curved spaces and models (interior space of an automobile).

The accuracy of the position determination is typically not indicated.

The process is time-consuming, complicated and inaccurate, so that these systems are rarely used.

In order to determine the position of a camera in a robot-assisted manufacturing for superimposition of real images on a virtual model of the manufacturing environment, it is proposed in the German published application DE 103 45 743 A1 to mount the camera on a robot and to use the internal measurement system of the robot, for example the angle sensors in the axle drives of the robot, for determining the camera position. However, this approach assumes that the coordinates of the robot are known. This solution cannot be used with unsupported cameras or other sensors.

It is therefore an object of the invention to provide a method and a system for determining the relative position of a first object in relation to a second object, as well as a corresponding computer program and a corresponding computer-readable storage medium, which obviate the aforementioned disadvantages and more particularly solve the positioning problem for the user in a clear, intuitive, simple and less time-consuming manner.

The object is attained according to the invention by the features recited in claims 1, 13, 18 and 19. Advantageous embodiments of the invention are recited in the dependent claims.

With the method of the invention, the method steps can advantageously be automated and the time required for determining the relative position can be reduced significantly by employing with the method for determining the relative position of a first object in relation to a second object at least one recording device for electromagnetic and/or acoustic waves (in the following simply referred to as recording device), for example an optical camera. A defined positional relationship is established between the first object and the at least one recording device, for example by fixedly connecting the recording device with the first object in a predetermined, known manner. In addition, the at least one recording device is positioned so that at least a portion of the electromagnetic and/or acoustic waves which originate from the second object are recorded by the at least one recording device. If an optical camera is used as a recording device, then at least a portion of the second object may be projected onto the recording medium (film, CCD chip). According to the invention, recording of the electromagnetic and/or acoustic waves is simulated by a data processing device, on which a corresponding program code is stored, for example in form of one or several computer programs. This is accomplished by arranging a computer-generated model of the second object and a model of the at least one recording device in virtual space. The position of the model of the second object and recording device(s) is defined in virtual space with reference to a model coordinate system, so that the wave propagation and wave recording can be simulated. The relative position of the first object in relation to the second object is then determined by transmitting at least a portion of the measurement values recorded by the at least one recording device to the data processing device, where their similarity with the values obtained by the simulation is compared and evaluated. If the recording device is a camera, then this can be done by pattern comparison, whereby the images recorded with the real camera are compared with the results from the simulated image recording. If the comparison indicates satisfactory similarity, then this indicates that the relative position of the recording device in relation to the second object is essentially identical to the relative position of the model of the at least one recording device in relation to the model of the second object in virtual space. The relative position of the first object in relation to the second object can then be easily derived from the relative position of the at least one recording device in relation to the second object, because the positional relationship between the first object and the recording device is well defined. User-defined criteria can be preset for evaluating the similarity.

If the similarity criterion is not satisfied, then the position of the at least one recording device is changed so as to adapt the measurement values recorded by the recording device to the values of the simulated recording. This change in position can be performed manually or automatically under the control of a computer program. In some embodiments, it may be advantageous to change, alternatively or in addition, the position of the model of the at least one recording device and/or the position of the model of the second objects in virtual space. The values recorded by the at least one recording device and/or generated by the simulation can then be changed and compared again and reevaluated. This process can continue until the predetermined similarity criterion is satisfied.

The first object can here be a measurement device with at least one sensor. Preferably, the measurement device has an array of sensors. In a particularly preferred embodiment, the array has identical sensors. Advantageously, at least one recording device may be at least temporarily fixedly integrated in the first object to attain the defined positional relationship. This can be accomplished, for example, by using releasable attachment means. According to a particularly preferred embodiment, the first object is an acoustic camera with an at least temporarily fixedly integrated optical camera as a recording device, i.e., the measurement device is implemented as a microphone array with an at least temporarily fixedly integrated optical camera.

The method has particular advantages in that:
  no measurements of three-dimensional coordinates and solid angles are required, and
  the recording device can be positioned and oriented quickly, intuitively and unambiguously.

Depending on the actual task, it may be advantageous to change the position of the at least one recording device and to maintain a fixed virtual configuration of the model of the at least one recording device and/or of the model of the second object. For example, in order to position a recording device (e.g., a camera) at the location of a previous recording or measurement, to reconstruct the performed recording or measurement, or to repeat the recording or measurement under the same conditions. For example, measurement values of an earlier recording are superimposed and compared with the live picture recorded by the real camera, whereafter the real camera is moved to the position and orientation of the original recording or measurement.

Another situation may arise if a measurement apparatus was moved to a favorable position for the measurement within a (complex) scene, such as an interior space of a motor vehicle, and the position the measurement apparatus (in a defined position in relation to at least one recording device) and a scene (second object) is to be determined. In this situation, the configuration of the model of the at least one recording device and/or of the model of the second object is changed in virtual space, whereas the position of the measurement apparatus representing the first object (and the at least one recording device) remains fixed.

The measurement values recorded by the at least one recording device are provided to the computer program, for example via a wired or wireless communication link.

In the computer-based model representation, the individual elements are oriented based on a model coordinate system. The position of the first object in relation to the second object is also defined based on a predetermined coordinate system. This coordinate system can be defined in absolute terms, i.e., independent of the first object and the second object. However, it can also have a fixed relationship to the first object and the second object. In a preferred embodiment of the method of the invention, the real and virtual first and second object may each be associated with a corresponding coordinate system, and the relative position of the first object in relation to the second object is derived from the relative position of the model of the at least one recording device and the model of the second object from the configuration in virtual space by way of a coordinate transformation. This only requires simple coordinate transformations.

According to another preferred embodiment of the method of the invention, if the recording device is a camera, then comparing the measurement values includes process steps used in photogrammetry, computer graphics and/or process steps used in image processing. In particular, a process step of photogrammetry may include evaluation of collinearity conditions and/or a process step of image processing may include pattern comparison.

Advantageously, comparing the measurement values includes determining at least one similarity value. Based on the similarity value, adaptation of the model to the real situation (or vice versa) can be terminated and the relative position of the two objects can be determined. In another preferred embodiment of the method of the invention, the similarity value is determined by a difference analysis.

According to another preferred embodiment of the method of the invention, the values recorded by the at least one recording device and/or the values obtained with the simulation may be visualized, preferably on the user interface of a data processing device.

The method for determining the relative position of the first object in relation to a second object can be accelerated by optimizing the change in position of the at least one recording device and/or the change of the configuration of the model of the at least one recording device and/or of the model of the second object in virtual space. Such optimization can be attained by designating at least one measurement value from the set of the measurement values recorded by the at least one recording device as a start value and designating a respective point of the model of the second object as an associated target value, and by automatically changing the position of the at least one recording device and/or the configuration of the model of the at least one recording device and/or of the model of the second object in virtual space depending on the designated start and target values. Depending on the task to be performed (see discussion above), at least one point of the model of the second object may advantageously be designated as a start value and a respective measurement value from the set of the measurement values recorded by the at least one recording device may advantageously be designated as an associated target value. After this designation, the position or the virtual configuration may be changed automatically under the control of a computer program.

Advantageously, the at least one start and target value may be designated by data entered by a user via the user interface of the data processing device. All conventional input means, such as a computer mouse, touchscreen and the like can be used for entering the data.

If the recording device is an optical camera, then connecting lines are defined by marking those point pairs which extend through a point of the model of the second object (target value) and that point of the camera model (start value) which corresponds to the point of the real optical camera onto which the point of the real second object is projected which corresponds to the target value in the model. The connecting lines can then be evaluated with respect to collinearity conditions and the position of the at least one recording device can be changed and/or the configuration of the model of the at least one recording device and/or of the model of the second object can be changed in virtual space. As a consequence of these positional changes, the target value is imaged by the simulation of the camera recording onto the respective start value. Stated differently: the virtual camera (model of the at least one recording device) views the model of the second object exactly in the same way as the real optical camera views the real second object.

According to another particular advantage of the method of the invention, the relative position of the first object in relation to the second object can be determined while the measurement values are recorded by the at least one recording device (online).

The system according to the invention for determining the relative position of a first object in relation to a second object includes at least one recording device for electromagnetic and/or acoustic waves in a defined positional relationship to the first object as well as a data processing device, wherein the at least one recording device is arranged so that electromagnetic and/or acoustic waves originating from the second object are recorded at least in part by the at least one recording device, and wherein the system is configured so that a method for determining the relative position of a first object in relation to a second object can be performed by simulating recording the electromagnetic and/or acoustic waves with one or more computer programs installed on the data processing device by arranging a model of the at least one recording device and a model of the second object in a virtual space, and determining the relative position of the first object in relation to the second object by provBelizedviding the measurement values recorded by the at least one recording device to the computer program and comparing the measurement values with the values generated by the simulation and evaluating the measurement values with respect to their similarity, deriving the relative position of the first object in relation to the second object from the relative position of the model of the at least one recording device in relation to the model of the second object in virtual space, if the result of the evaluation satisfies a predeterminable criterion, or changing, comparing and reevaluating the values recorded by the at least one recording device and/or the values generated by the simulation by changing the position of the at least one recording device and/or by changing the configuration of the model of the at least one recording device and/or of the model of the second object in virtual space.

Advantageously, the method for determining the relative position of the first object in relation to a second object is performed with a computer program. The computer program according to the invention is characterized in that the computer program enables a computer, after the computer program is loaded into computer memory, to perform a method for determining the relative position of a first object in relation to a second object, wherein the first object has a defined positional relationship to at least one recording device for electromagnetic and/or acoustic waves and the at least one recording device is arranged so that electromagnetic and/or acoustic waves originating from the second object are recorded at least partially by the at least one recording device, wherein the recording of the electromagnetic and/or acoustic waves is simulated in a data processing device having one or more computer programs installed on the data processing device by arranging a model of the at least one recording device and a model of the second object in a virtual space, and wherein the relative position of the first object is determined in relation to the second object by providing the measurement values recorded by the at least one recording device to the computer program and comparing the measurement values with the values generated by the simulation and evaluating the measurement values with respect to their similarity, deriving the relative position of the first object in relation to the second object from the relative position of the model of the at least one recording device in relation to the model of the second object in virtual space, if the result of the evaluation satisfies a predeterminable criterion, or changing, comparing and reevaluating the values recorded by the at least one recording device and/or the values generated by the simulation by changing the position of the at least one recording device and/or by changing the configuration of the model of the at least one recording device and/or of the model of the second object in virtual space.

For example, such computer programs can be provided (fee-based or free of charge, freely accessible or password-protected) in a data or communication network for downloading. The provided computer programs can be used with a method, wherein a computer program according to claim 18 is downloaded from an electronic data network, for example from the Internet, to a data processing system connected to the data network.

Advantageously, the computer program of the invention may be distributed on a computer-readable storage medium, which stores a program that enables a computer, after being loaded into computer memory, to execute a method for determining the relative position of a first object in relation to a second object, wherein the first object has a defined positional relationship to at least one recording device for electromagnetic and/or acoustic waves and wherein the at least one recording device is configured so that electromagnetic and/or acoustic waves originating from the second object are recorded at least partially by the at least one recording device, wherein recording the electromagnetic and/or acoustic waves is simulated in a data processing device having one or more computer programs installed on the data processing device by arranging a model of the at least one recording device and a model of the second object in virtual space, and wherein the relative position of the first object in relation to the second object is determined by providing the measurement values recorded by the at least one recording device to the computer program and comparing the measurement values with the values generated by the simulation and evaluating the measurement values with respect to their similarity, deriving the relative position of the first object in relation to the second object from the relative position of the model of the at least one recording device in relation to the model of the second object in virtual space, if the result of the evaluation satisfies a predeterminable criterion, or changing, comparing again and reevaluating the values recorded by the at least one recording device and/or the values generated by the simulation by changing the position of the at least one recording device and/or by changing the configuration of the model of the at least one recording device and/or of the model of the second object in virtual space.

An exemplary embodiment of the invention will now be described with reference to the figures of the appended drawings.

Figure 3A:
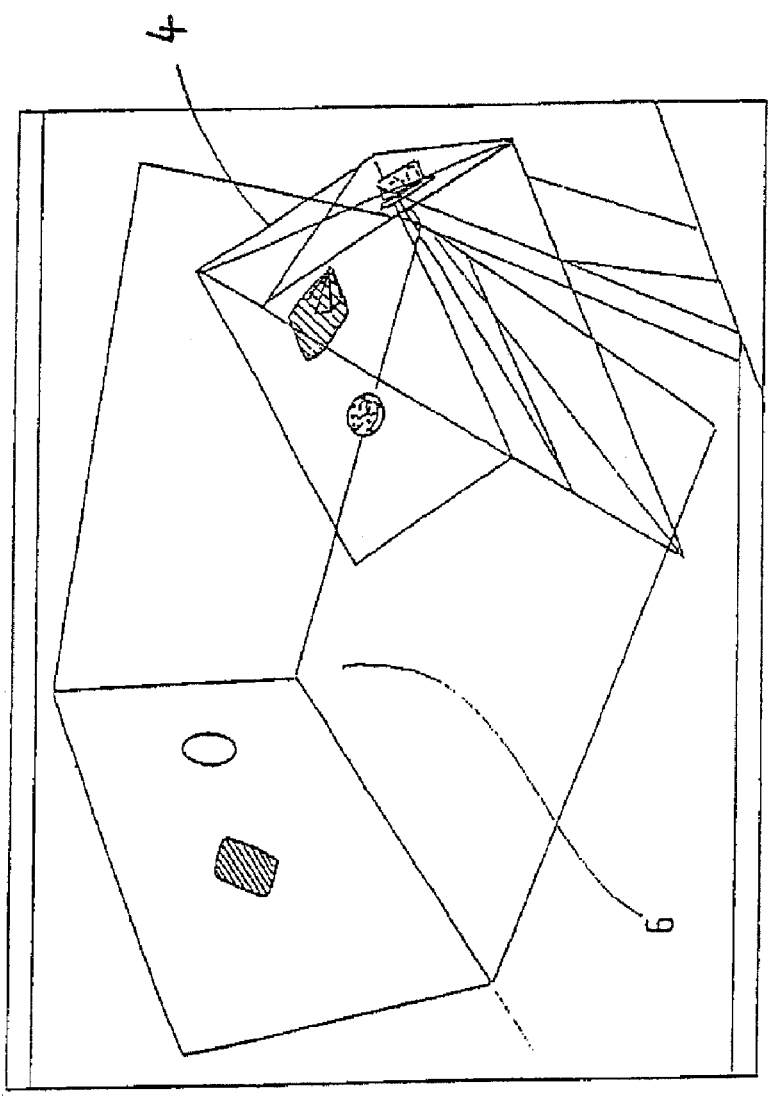
FIG. 3 shows a monitor display with view of the 3-D model (FIG. 3*a* box model.
FIG. 3*b* interior space of an automobile) and the optical image as viewed by the optical camera.
Figure 3B:
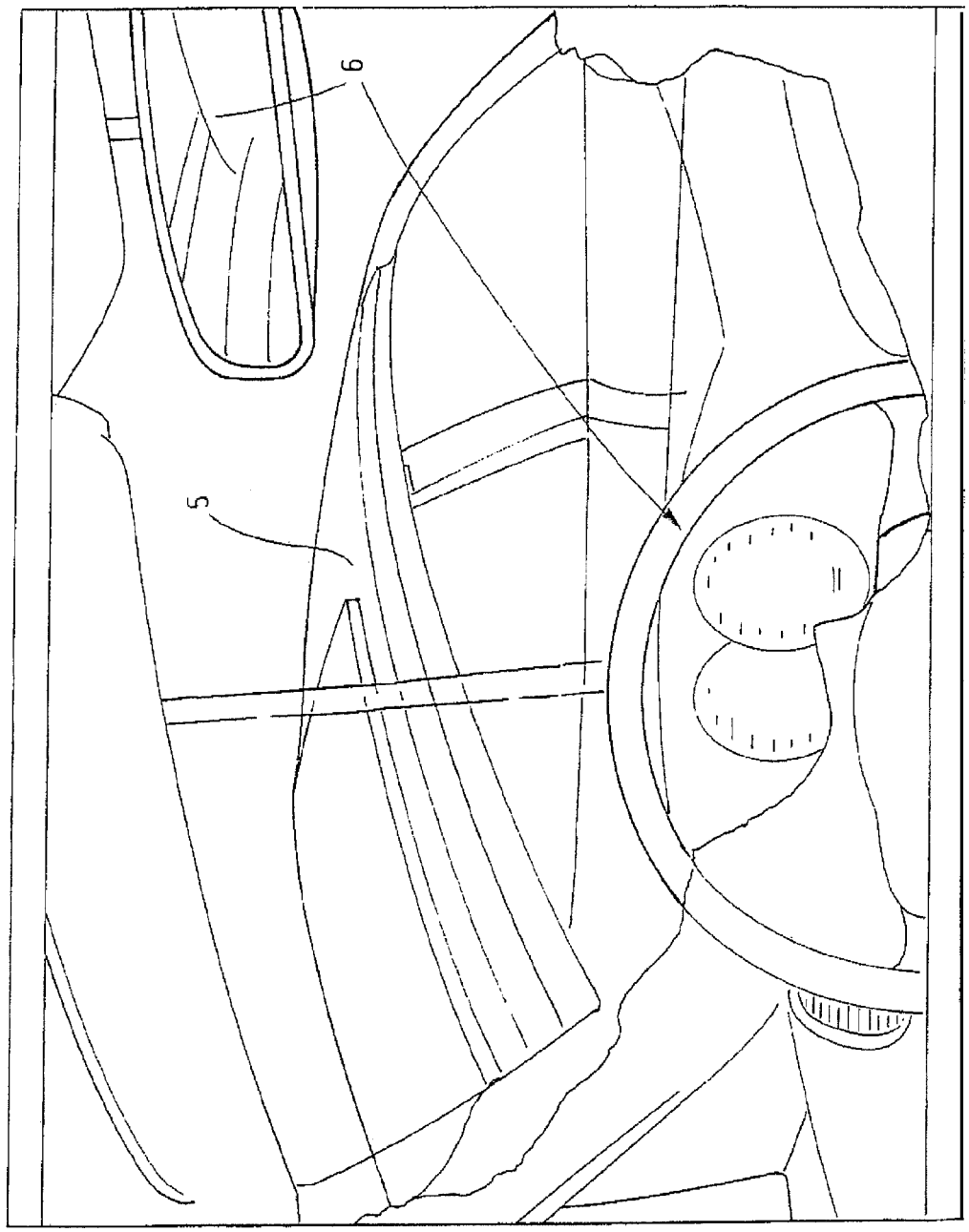
Figure 4B:
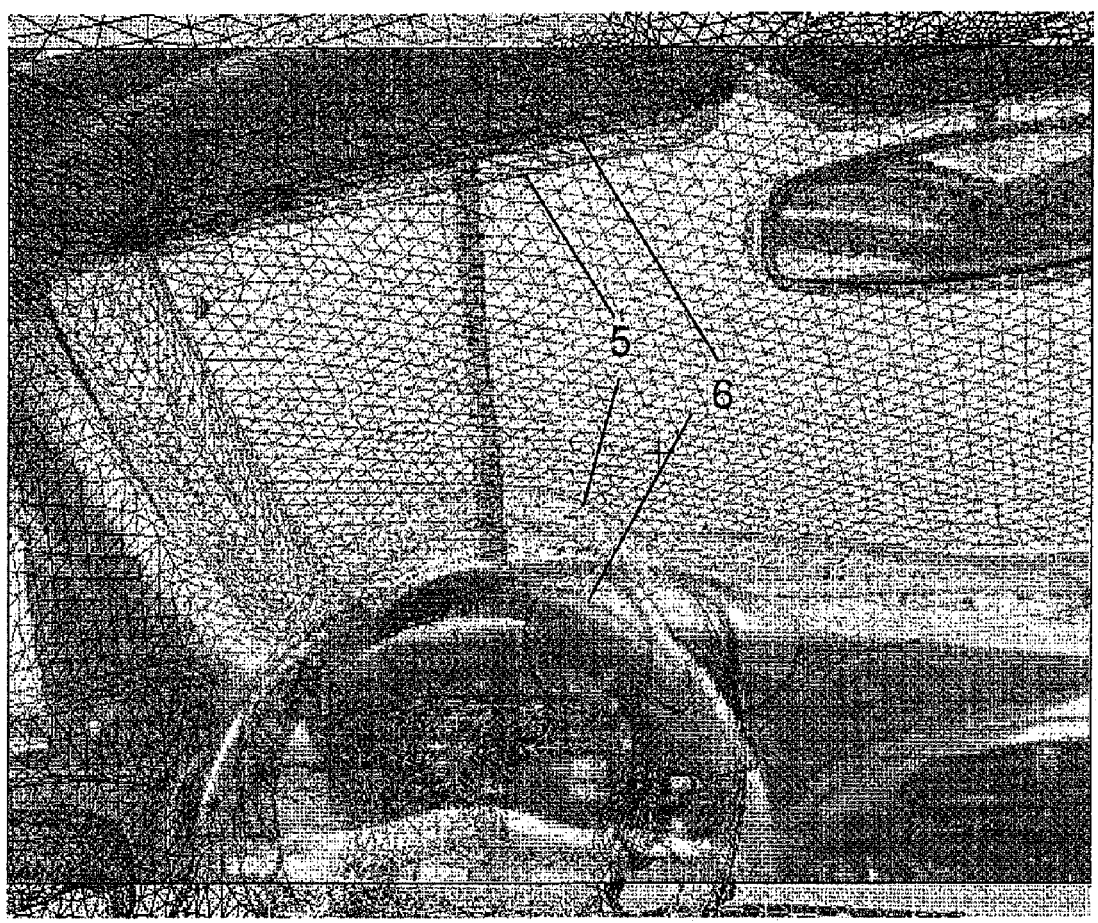
Figure 5A:
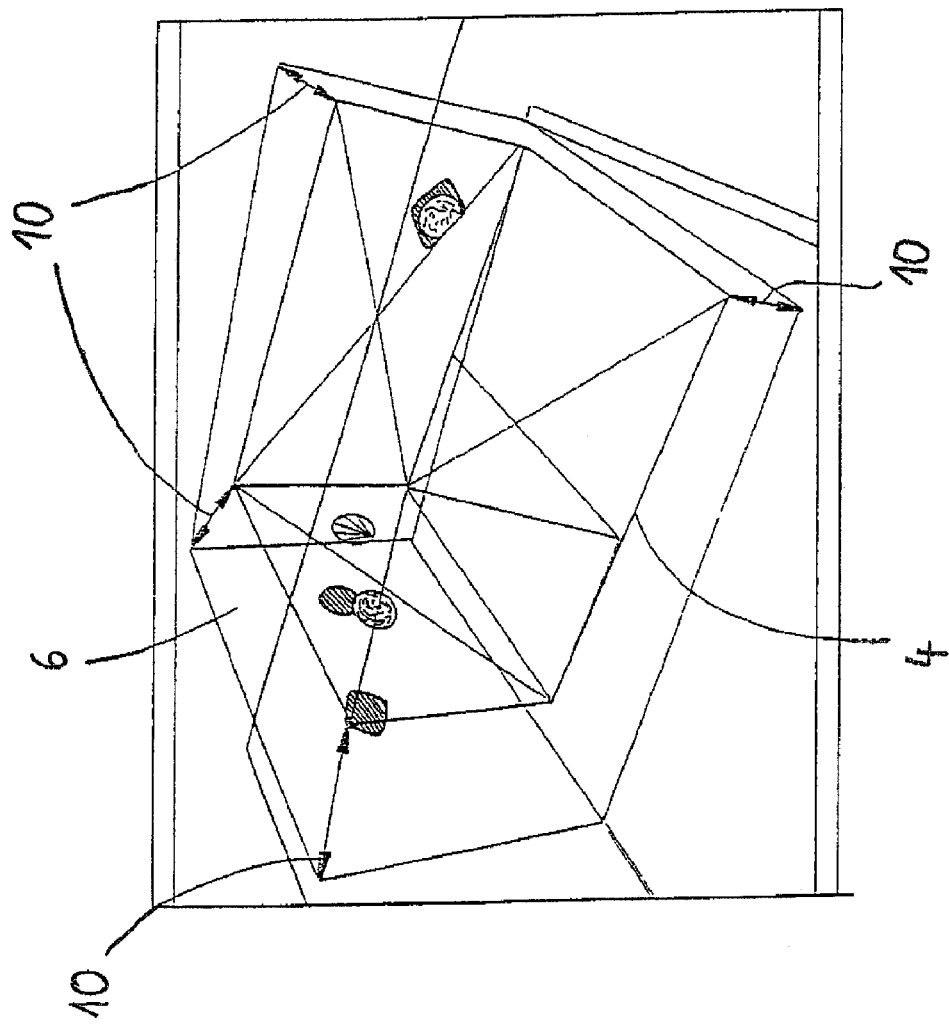
Figure 5B:
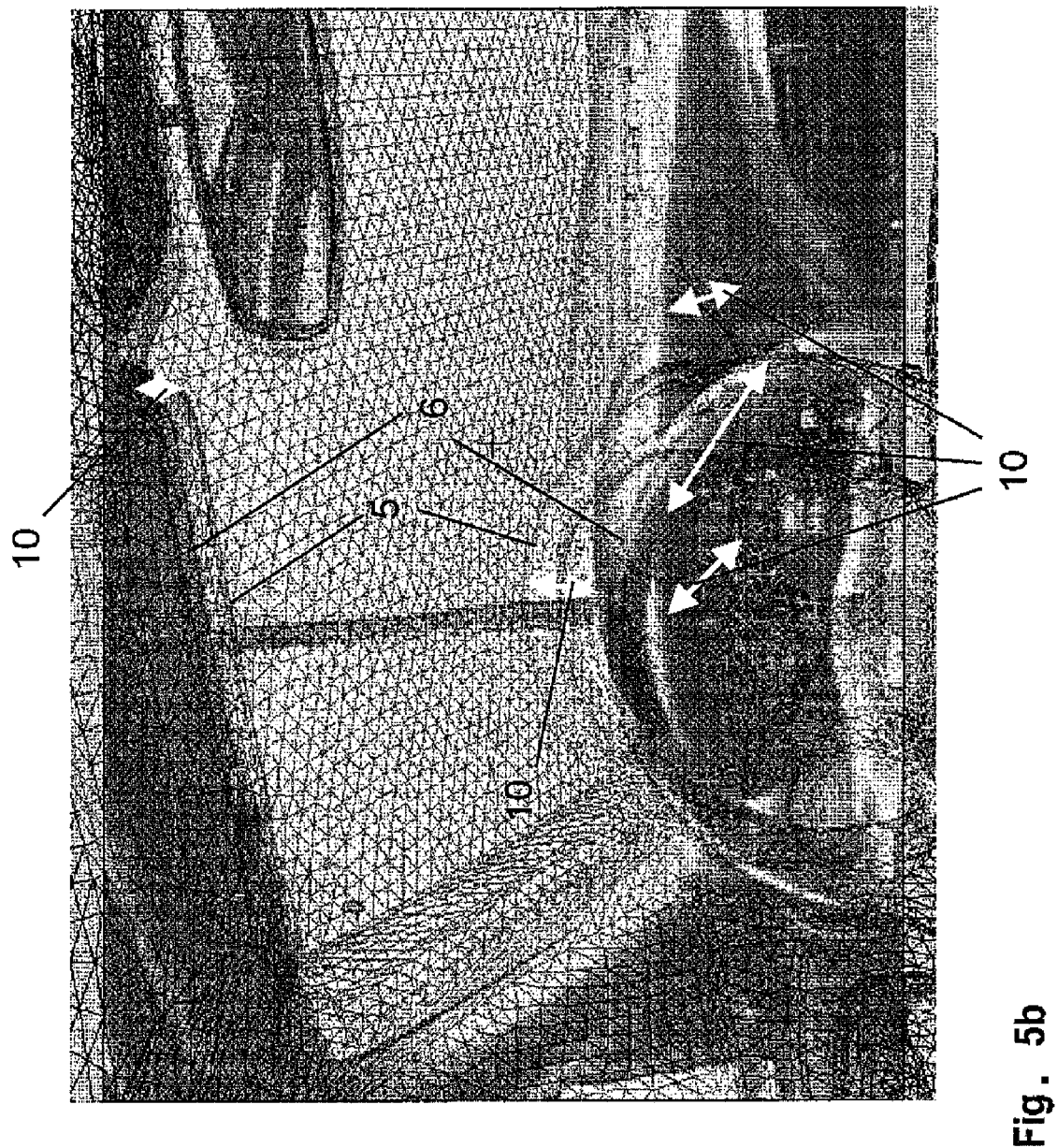
Figure 6A:
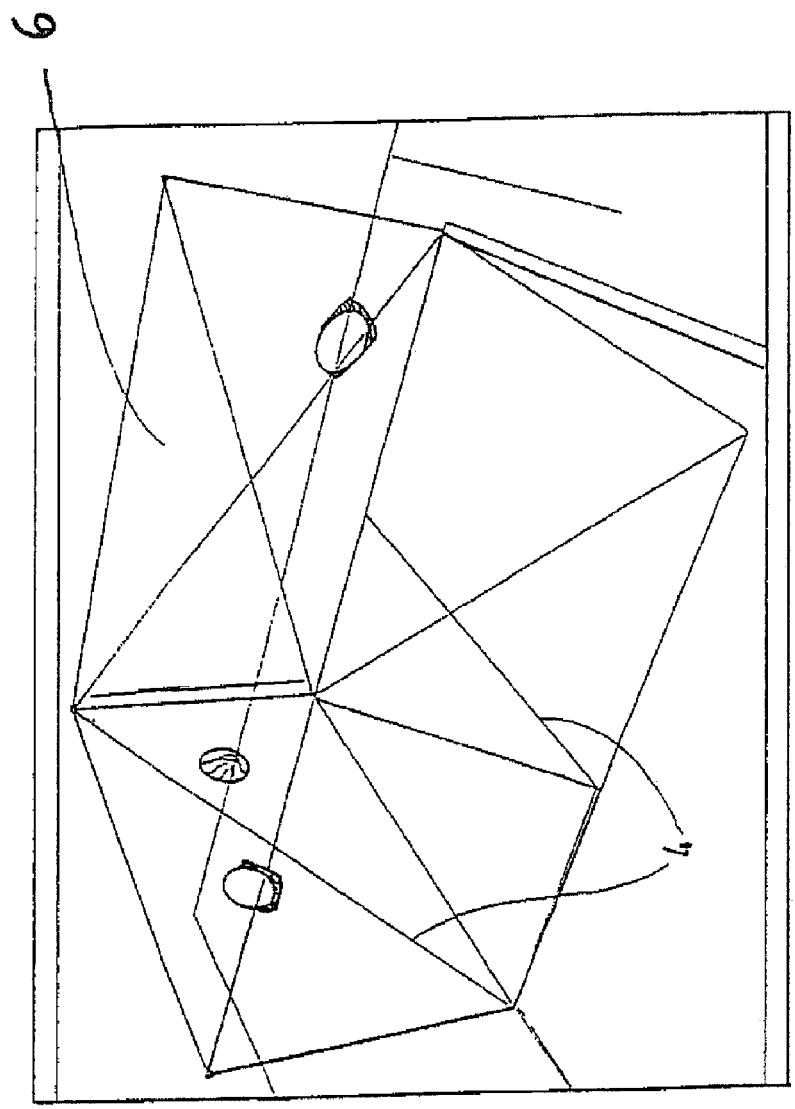
Figure 6B:
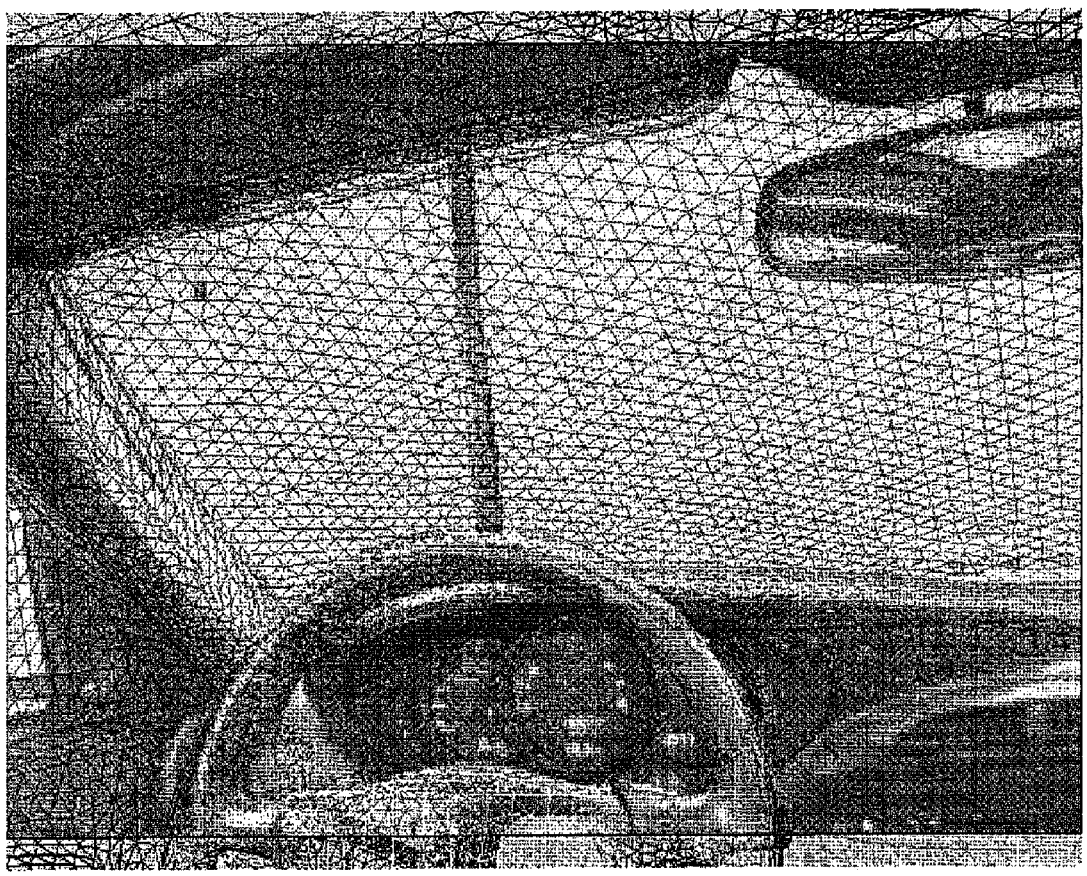
Figure 7A:
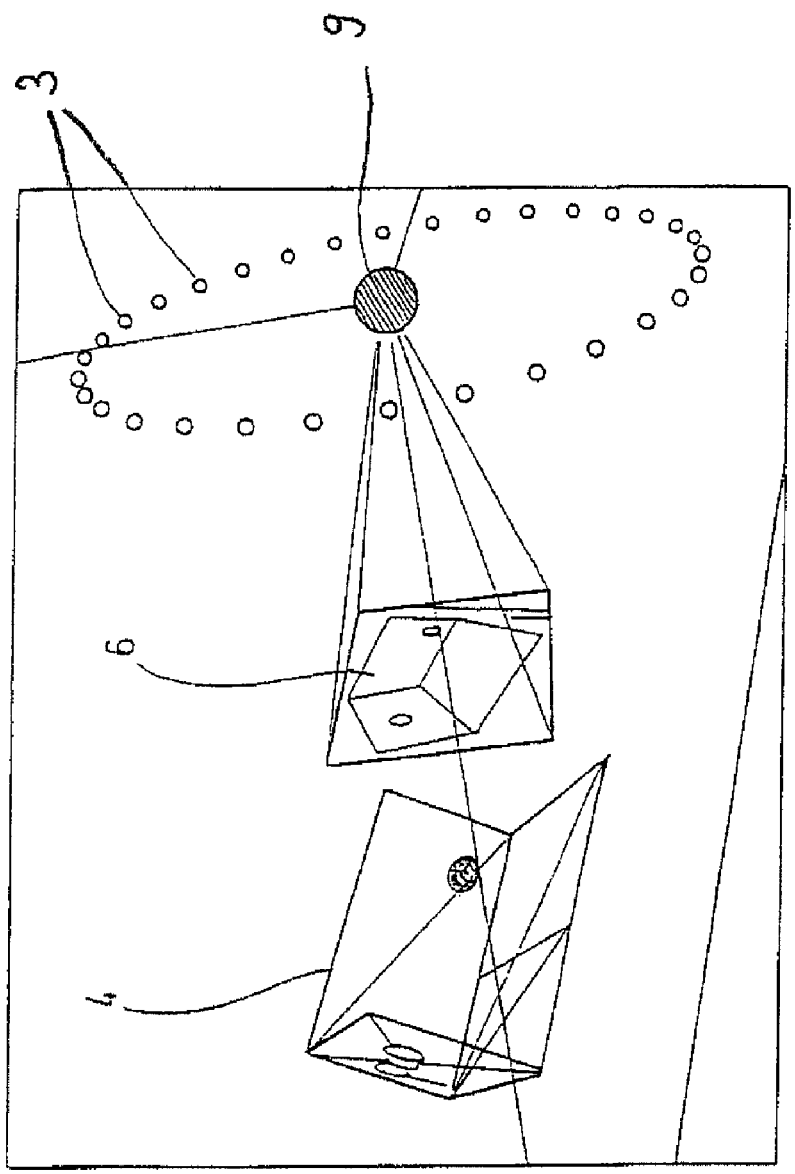
Figure 7B:
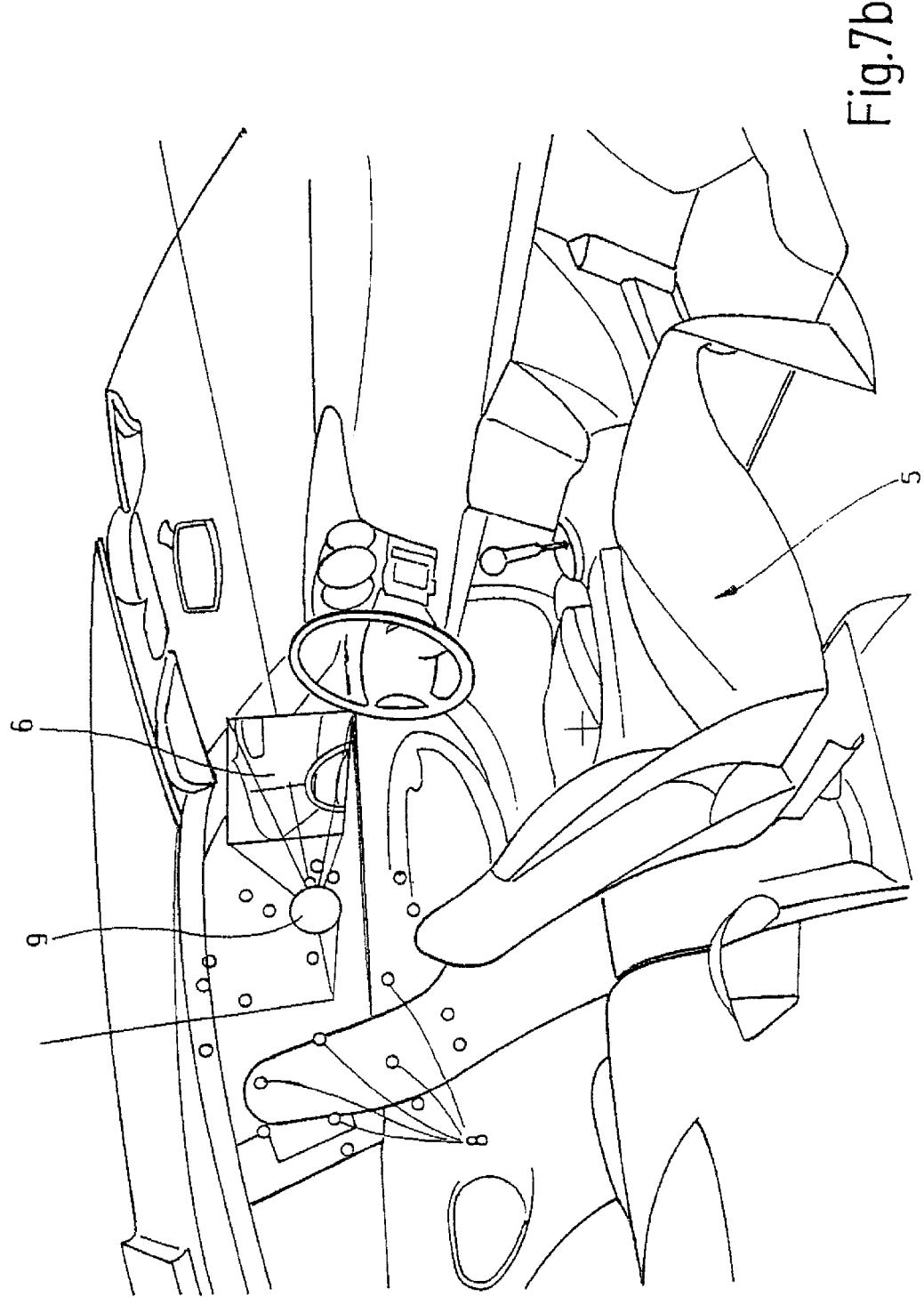

FIGS. 4*a, b* shows a view as in FIG. 3, wherein the model of the acoustic camera and the optical camera connected with the acoustic camera are positioned and oriented so that the optical image viewed by the optical camera (live image) and the two-dimensional projection of the model scene recorded by the virtual camera are congruent in a first approximation;

FIGS. 5*a, b* shows a view as in FIG. 4, after point pairs are selected for automatic adaptation of the two-dimensional projection of the model scene recorded by the virtual camera to the optical image as viewed by the optical camera (live image);

FIGS. 6*a, b* shows a view as in FIG. 5, after the computation and after improving the position and orientation; and FIGS. 7*a, b* shows a view onto the 3-D model (FIG. 7*a* box model; FIG. 7*b* interior space of an automobile), the microphones of the acoustic camera with the optical camera and the optical image as viewed by the virtual camera after successful orientation and positioning.

An example of the invention will now be described for a particular situation of determining the position of an acoustic camera 3 in relation to a simple geometric object (box model 1) and in relation to a complex environment (interior space 2 of an automobile). In the method described below, the acoustic camera 3 is positioned at a location advantageous for the measurement and the real live image 6 of the optical camera 7 is matched to the related recording from a virtual camera by modifying the computer-based model (model 4 of the 3-D object or model 5 of the interior space 2 of the automobile). After the two images are matched, the relative position of the optical camera 7 and the box model 1 or the interior space 2 of the automobile are known, so that the relative position of acoustic camera 3 and the box model 1 or the interior space 2 of the automobile can be readily calculated from the defined positional relationship between the optical camera 7 and the acoustic camera 3.

It should be noted that the invention is not limited to the exemplary embodiment described below, but that the method can also be used if, for example, the optical camera 7 is moved for the purpose of matching the live image with the simulated recording of the virtual camera, or if a different recording device for electromagnetic and/or acoustic waves (for example, an acoustic camera) is used in lieu of the optical camera 7.

In the exemplary embodiment, an acoustic camera 3 with a built-in optical sensor is used, for example a digital video camera which produces a live video image. The camera exists in physical form. The acoustic camera 3 herein represents the first object, and the optical camera 7 represents the at least one recording device.

Moreover, in the exemplary embodiment a virtual camera is employed which simulates acquisition of measurement values by the optical camera 7. The virtual camera therefore represents the virtual view through the particular camera that can be used to view the three-dimensional scene, consisting of the model 8 of the acoustic camera and the model 4 of the 3-D object (see FIGS. 2*a, b*) on the monitor or display. More particularly, the simulation includes tracing the optical path from the real object through the lens system of the (real) optical camera 7 and the projection of the (real) three-dimensional scene onto the corresponding recording medium of the (real) optical camera 7 (CCD chip or film). Because the simulation takes into account the optical parameters of the real optical camera 7, for example focal length, aperture angle, and possibly also distortion, the attained result of the simulation is a two-dimensional projection 11 of the virtual 3-D scene, exactly as if a corresponding real scene were recorded with the real optical camera 7.

Figure 1B:
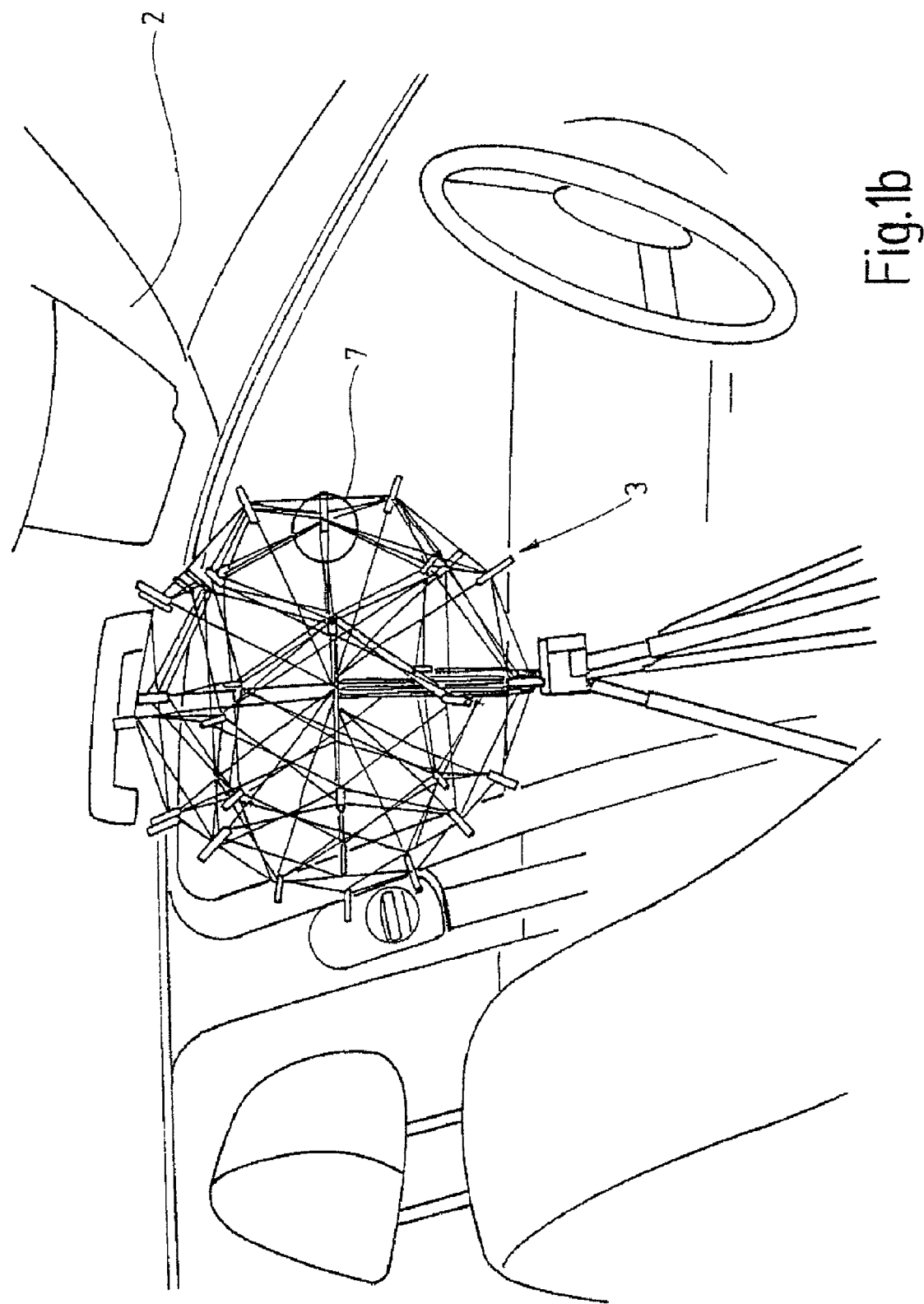
FIG. 1 shows an acoustic camera and a 3-D object to be measured. a) box model; b) interior space of an automobile.

The relative position of the acoustic camera 3 in relation to the box model 1 or the interior space 2 of the automobile can be determined, for example, in the following manner (herein the box model 1 or the interior space 2 of the automobile represent the second object, in relation of which the relative position of the acoustic camera 3 is to be determined):

1. The acoustic camera 3 is set up in the appropriate space (interior space 2 of the automobile, acoustic lab, etc.) according to the desired measurement conditions and desired results (FIGS. 1*a, b*).
2. A three-dimensional model of the space or the measurement object (e.g., the box model 1 or interior space 2 of the automobile) and a model of the employed acoustic camera 3 are loaded in the computer. This scene can then be viewed through the virtual camera and the view through the virtual camera can be visualized on the display screen of a computer. The result is a scene as depicted in FIG. 2*a* or 2*b*.

Figure 2A:
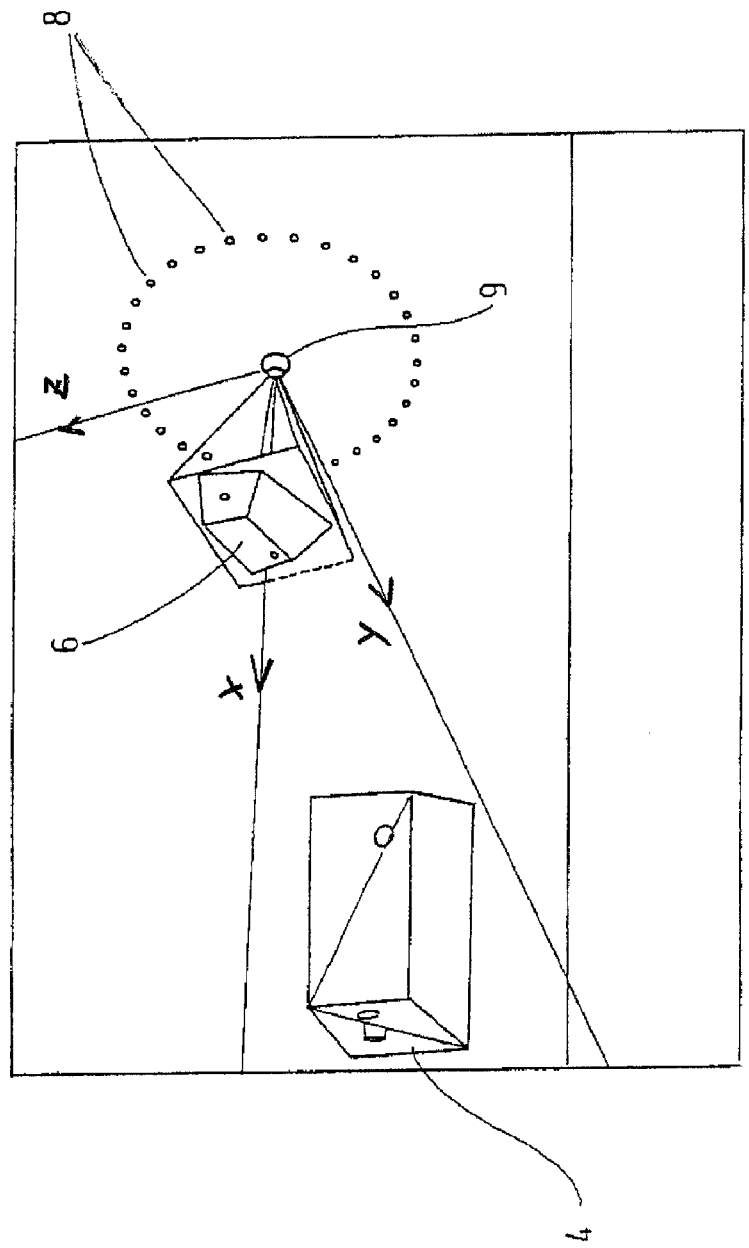
FIG. 2 shows a view of the live image of a 3-D object projected into the space, wherein the 3-D object is recorded by an optical camera connected with the acoustic camera, the 3-D model (FIG. 2*a* box model.
FIG. 2*b* interior space of an automobile) and the microphones of the acoustic camera as viewed by a virtual camera (visualized on a computer monitor screen)
Figure 2B:
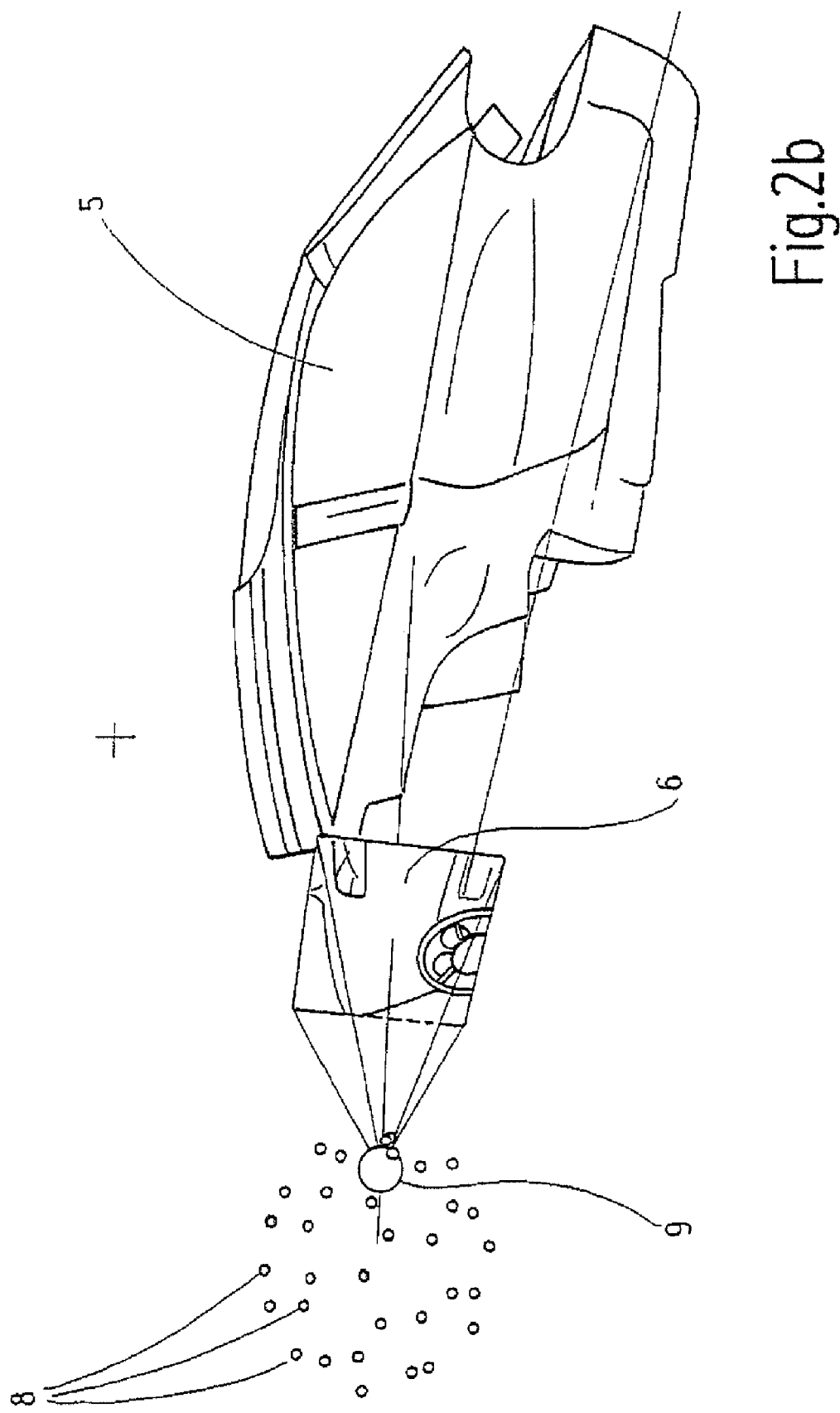

FIGS. 2*a* and 2*b* also show the live image 6 from the optical camera 7.

3. Determination of the position and orientation

In a first step, the virtual camera is automatically moved to the position and orientation of the model of the optical camera 9. When using a computer program, this may be accomplished by providing input via a graphic user interface, for example by pressing a button "camera orientation." When both camera positions match, then the virtual camera and the model 9 of the optical camera are "merged." The user is now under the impression of viewing the scene from the view of the model 9 of the optical camera located in the model 8 of the acoustic camera. The live image 6 and the three-dimensional model can be visualized together by changing the image transparency (see FIGS. 3*a*, 3*b*).

The position and orientation of the virtual camera can be changed in the (virtual) model space with the mouse and cursor keys, so that the three-dimensional object (model 4 of the 3-D object or model 5 of the interior space of the automobile) coarsely matches the live image 6 (tracking shot). The model of the acoustic camera hereby tracks in a similar manner (see FIGS. 4*a, b*).

Following coarse positioning, the computer display shows a coarse match of the live image 6 and the two-dimensional projection 11 of the virtual 3-D scene (as a result of the stimulation of the acquisition of measurement values by the real optical camera 7). All further processed steps can be automated. For example, the computer program can be switched into positioning mode. Successive point pairs 10 (preferably a model point and the corresponding point in the live image 6) are selected on the computer display with the computer mouse. (Corresponding point pairs are, for example, the upper right corner of the box model and the upper right corner of the box in the projection, and the like). Advantageously, the point pairs 10 may be represented on the computer display as double arrows. At least three spatially separated point pairs 10 are to be selected. Each additional point pair 10 improves the position and orientation and aids in assessing the accuracy. Input errors by the user (outliers) can also be identified automatically (FIGS. 5*a, b*).

Input of the point pairs 10 provides a computer program with the data to be used for automatically moving the virtual camera to the same position as the real optical camera 7, so as to match the two-dimensional projection 11 of the model scene recorded by the virtual camera with the live image 6. A number of image processing methods are known for this purpose. In the aforedescribed approach, i.e., for selecting a model point and a corresponding point in the live image 6, collinearity conditions are preferably evaluated. A computer program which executes these collinearity conditions can be started, for example by pressing the button "Calculate." The correct camera position and orientation are then determined and displayed ("Fitting"). The two-dimensional projection 11 of the model scene recorded with the virtual camera now matches the live image 6. The position and orientation of the model 9 of the optical camera and hence the position of the acoustic camera 3 connected to the optical camera can then be readily determined in relation to the measurement object, because the coordinates of the corresponding models are known (FIGS. 6a, b).

Inaccuracies can occur when inputting the point pairs 10. According to another exemplary embodiment, these inaccuracies can be corrected, after obtaining a match with the help of the point pairs 10, by further refining the relative position of the acoustic camera 3 with respect to the box model 1 or with respect to the interior space 2 of the automobile through an additional step of comparing the pattern between the live image 6 and the two-dimensional projection 11 of the virtual 3-D scene. This additional pattern comparison can also be used to correct input errors in the selection of the point pairs 10.

It would also be feasible to determine the relative position of the acoustic camera 3 in relation to the box model 1 or in relation to the interior space 2 of the automobile exclusively by a pattern comparison between the live image 6 and the two-dimensional projection 11 of the virtual 3-D scene, i.e., without actually connecting points of the live image 6 with points of the virtual model. To this end, the model 9 of the optical camera is moved virtually in the 3-D model and a decision is made (preferably automatically) about further movement directions or termination of the method by comparing the pattern of the generated two-dimensional projection 11 of the virtual 3-D scene and the live image 6.

The virtual camera detaches from the position and orientation of the model 9 of the optical camera and then the observes the scene again "from the outside." The model 8 of the acoustic camera and the model 4 of the 3-D object or the model 5 of the interior space of the automobile in the model scene are then at exactly the same position (location and orientation) as the real acoustic camera 3 and the real box model 1 or the real interior space 2 of the automobile.

The implementation of the invention is not limited to the aforedescribed preferred exemplary embodiments. Instead, a number of modifications can be contemplated which make use of the system and method of the invention in entirely different embodiments.

LIST OF REFERENCE SYMBOLS 1 box model
2 interior space of an automobile
3 acoustic camera
4 model of the 3-D object
5 model of the interior space of an automobile
6 live image
7 optical camera
8 model of the acoustic camera
9 model of the optical camera
10 point pair
11 two-dimensional projection of the model scene recorded by the virtual camera

The invention claimed is:

1. A method for determining a relative position of a first object in relation to a second object, comprising the steps of:
   (a) providing at least one recording device for recording electromagnetic or acoustic waves, wherein the at least one recording device has a defined positional relationship to the first object and is arranged so that waves originating from the second object are recorded at least partially by the at least one recording device;
   (b) simulating recording of the electromagnetic and/or acoustic waves in a data processing device having one or more computer programs installed on the data processing device by arranging a model of the at least one recording device and a model of the second object in a virtual space;
   (c) determining the relative position of the first object in relation to the second object by
   providing measurement values recorded by the at least one recording device to the computer program and comparing the measurement values with values generated by the simulation and evaluating a similarity between the measurement values and the values generated by the simulation,
   deriving the relative position of the first object in relation to the second object from a relative position of the model of the at least one recording device in relation to the model of the second object in virtual space, if the result of the evaluation satisfies a predeterminable criterion, or
   changing, comparing again and reevaluating the values recorded by the at least one recording device or the values generated by the simulation, or both, by changing a position of the at least one recording device or by changing a configuration of the model of the at least one recording device or of the model of the second object in virtual space, or a combination thereof and
   (d) (i) designating at least one measurement value from a set of measurement values recorded by the at least one recording device as a start value, (ii) designating a respective point of the model of the second object as an associated target value, and (iii) automatically changing the position of the at least one recording device or the configuration of the model of the at least one recording device or of the model of the second object, or a combination thereof, in virtual space depending on the designated start and target values, or
   (e) (i) designating at least one point of the model of the second object as a start value, (ii) designating a respective measurement value from the set of the measurement values recorded by the at least one recording device as an associated target value, and (iii) automatically changing the position of the at least one recording device or the configuration of the model of the at least one recording device or of the model of the second object, or a combination thereof, in virtual space depending on the designated start and target values.

2. The method according to claim 1, wherein the recording device is implemented as an optical camera or an acoustic camera, or a combination thereof.

3. The method according to claim 1, further comprising the steps of associating the first and second object as well as the model of the at least one recording device and the model of the second object with a corresponding coordinate system, and deriving the relative position of the first object in relation to the second object from the relative position of the model of the at least one recording device in relation to the model of the second object in virtual space by a coordinate transformation.

4. The method according to claim 1, wherein comparing the measurement values includes process steps used in photogrammetry, computer graphics or image processing, or a combination thereof.

5. The method according to claim 1, wherein comparing the measurement values includes determining at least one similarity value.

6. The method according to claim 1, further comprising the step of visualizing the values recorded by the at least one recording device or the values obtained with the simulation, or both.

7. The method according to claim 1, wherein the relative position of the first object in relation to the second object is determined during recording of the measurement values by the at least one recording device.

8. The method according to claim 5, wherein the at least one similarity value is determined by a difference analysis.

9. The method according to claim 6, wherein the values are visualized on a user interface of a data processing device.

10. The method according to claim 9, wherein the at least one start and target value are designated by data input via the user interface of the data processing device.

11. A system for determining a relative position of a first object in relation to a second object, comprising:
  at least one recording device having a defined positional relationship to the first object and configured to at least partially record electromagnetic or acoustic waves originating from the second object;
  a data processing device; and
  one or more computer programs installed on the data processing device and configured to:
    (a) simulate recording the electromagnetic or acoustic waves by arranging a model of the at least one recording device and a model of the second object in a virtual space;
    (b) determine the relative position of the first object in relation to the second object by
    providing measurement values recorded by the at least one recording device to the computer program and comparing the measurement values with values generated by the simulation and evaluating a similarity between the measurement values and the values generated by the simulation,
    deriving the relative position of the first object in relation to the second object from a relative position of the model of the at least one recording device in relation to the model of the second object in virtual space, if the result of the evaluation satisfies a predeterminable criterion, or
    changing, comparing again and reevaluating the values recorded by the at least one recording device or the values generated by the simulation, or both, by changing a position of the at least one recording device or by changing a configuration of the model of the at least one recording device or of the model of the second object in virtual space, or a combination thereof; and
    (c) (i) designating at least one measurement value from a set of measurement values recorded by the at least one recording device as a start value, (ii) designating a respective point of the model of the second object as an associated target value, and (iii) automatically changing the position of the at least one recording device or the configuration of the model of the at least one recording device or of the model of the second object, or a combination thereof, in virtual space depending on the designated start and target values, or
    (d) (i) designating at least one point of the model of the second object as a start value, (ii) designating a respective measurement value from the set of the measurement values recorded by the at least one recording device as an associated target value, and (iii) automatically changing the position of the at least one recording device or the configuration of the model of the at least one recording device or of the model of the second object, or a combination thereof, in virtual space depending on the designated start and target values.

12. The system according to claim 11, wherein the at least one recording device is at least temporarily fixedly integrated in the first object.

13. The system according to claim 11, wherein the first object is a measurement apparatus having at least one sensor.

14. The system according to claim 13, wherein the measurement apparatus is implemented as a sensor array.

15. The system according to claim 13, wherein the measurement apparatus is a microphone array, the measurement apparatus further including an integrated optical camera.

16. A computer program which enables a computer, after the program is loaded into a memory of the computer, to execute a method for determining a relative position of a first object in relation to a second object, with the steps of:
  (a) recording with at least one recording device having a defined positional relationship to the first object electromagnetic or acoustic waves originating from the second object at least partially;
  (b) simulating recording of the electromagnetic or acoustic waves in a data processing device having one or more computer programs installed on the data processing device by arranging a model of the at least one recording device and a model of the second object in virtual space;
  (c) determining the relative position of the first object in relation to the second object by
  providing measurement values recorded by the at least one recording device to the computer program and comparing the measurement values with values generated by the simulation and evaluating a similarity between the measurement values and the values generated by the simulation,
  deriving the relative position of the first object in relation to the second object from a relative position of the model of the at least one recording device in relation to the model of the second object in virtual space, if the result of the evaluation satisfies a predeterminable criterion, or
  changing, comparing again and reevaluating the values recorded by the at least one recording device or the values generated by the simulation, or both, by changing a position of the at least one recording device or by changing a configuration of the model of the at least one recording device or of the model of the second object in virtual space, or a combination thereof; and
  (d) (i) designating at least one measurement value from a set of measurement values recorded by the at least one recording device as a start value, (ii) designating a respective point of the model of the second object as an associated target value, and (iii) automatically changing the position of the at least one recording device or the configuration of the model of the at least one recording device or of the model of the second object, or a combination thereof, in virtual space depending on the designated start and target values, or (e) (i) designating at least one point of the model of the second object as a start value, (ii) designating a respective measurement value from the set of the measurement values recorded by the at least one recording device as an associated target value, and (iii) automatically changing the position of the at least one recording device or the configuration of the model of the at least one recording device or of the model of the second object, or a combination thereof, in virtual space depending on the designated start and target values.

17. The computer program according to claim 16, wherein the computer program is downloaded from an electronic data network to a data processing device connected to the data network.

18. The computer program according to claim 17, wherein the electronic data network is the Internet.

19. A computer-readable storage medium having stored thereon a program which enables a computer, after the program is loaded into a memory of the computer, to execute a method for determining a relative position of a first object in relation to a second object, with the steps of:

(a) recording with at least one recording device having a defined positional relationship to the first object electromagnetic or acoustic waves originating from the second object at least partially;

(b) simulating recording of the electromagnetic or acoustic waves in a data processing device having one or more computer programs installed on the data processing device by arranging a model of the at least one recording device and a model of the second object in virtual space;

(c) determining the relative position of the first object in relation to the second object by providing measurement values recorded by the at least one recording device to the computer program and comparing the measurement values with values generated by the simulation and evaluating a similarity between the measurement values and the values generated by the simulation, deriving the relative position of the first object in relation to the second object from a relative position of the model of the at least one recording device in relation to the model of the second object in virtual space, if the result of the evaluation satisfies a predeterminable criterion, or changing, comparing again and reevaluating the values recorded by the at least one recording device or the values generated by the simulation, or both, by changing a position of the at least one recording device or by changing a configuration of the model of the at least one recording device or of the model of the second object in virtual space, or a combination thereof; and (d) (i) designating at least one measurement value from a set of measurement values recorded by the at least one recording device as a start value, (ii) designating a respective point of the model of the second object as an associated target value, and (iii) automatically changing the position of the at least one recording device or the configuration of the model of the at least one recording device or of the model of the second object, or a combination thereof, in virtual space depending on the designated start and target values, or (e) (i) designating at least one point of the model of the second object as a start value, (ii) designating a respective measurement value from the set of the measurement values recorded by the at least one recording device as an associated target value, and (iii) automatically changing the position of the at least one recording device or the configuration of the model of the at least one recording device or of the model of the second object, or a combination thereof, in virtual space depending on the designated start and target values.

* * * * *